(12) United States Patent
Mackenzie et al.

(10) Patent No.: US 11,524,593 B2
(45) Date of Patent: Dec. 13, 2022

(54) ELECTRIC VEHICLE SUPPLY EQUIPMENT SYNCHRONIZATION AND CHARGING CONNECTOR DEVICES

(71) Applicant: FORD GLOBAL TECHNOLOGIES, LLC, Dearborn, MI (US)

(72) Inventors: Kevin Mackenzie, Canton, MI (US); Jonathan Barker, Ann Arbor, MI (US); Liam West, Southfield, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 86 days.

(21) Appl. No.: 17/014,071

(22) Filed: Sep. 8, 2020

(65) Prior Publication Data
US 2022/0072967 A1 Mar. 10, 2022

(51) Int. Cl.
| | |
|---|---|
| *B60L 53/16* | (2019.01) |
| *B60L 53/66* | (2019.01) |
| *B60L 53/30* | (2019.01) |
| *H02J 7/00* | (2006.01) |
| *H01R 31/02* | (2006.01) |

(Continued)

(52) U.S. Cl.
CPC ............ *B60L 53/16* (2019.02); *B60L 53/305* (2019.02); *B60L 53/66* (2019.02); *H01R 13/6675* (2013.01); *H01R 31/02* (2013.01); *H02J 7/0045* (2013.01); *B60K 6/28* (2013.01); *B60Y 2200/91* (2013.01); *B60Y 2200/92* (2013.01);

(Continued)

(58) Field of Classification Search
CPC ........ B60L 53/16; B60L 53/66; B60L 53/305; H01R 13/6675; H01R 31/02; H01R 2201/26; H02J 7/0045; H02J 2310/48; B60K 6/28; B60Y 2200/91; B60Y 2200/92; B60Y 2300/91
USPC ........................................................ 320/109
See application file for complete search history.

(56) References Cited

U.S. PATENT DOCUMENTS

| | | | |
|---|---|---|---|
| 9,630,513 | B2 | 4/2017 | Fietzek et al. |
| 10,259,336 | B2 | 4/2019 | McQuillen et al. |

(Continued)

FOREIGN PATENT DOCUMENTS

| | | | | |
|---|---|---|---|---|
| CN | 206865191 | U | * | 1/2018 |
| CN | 111786050 | A | * | 10/2020 |

(Continued)

OTHER PUBLICATIONS

Lambert, First look at Tesla's new dual connector CCS Supercharger, electrek, five pages, Dec. 12, 2018 https://electrek.co/2018/12/12/tesla-dual-connector-ccs-supercharger; from internet Mar. 26, 2020.

*Primary Examiner* — Suresh Memula
(74) *Attorney, Agent, or Firm* — David B. Kelley; Carlson, Gaskey & Olds, P.C.

(57) ABSTRACT

This disclosure describes electric vehicle supply equipment (EVSE) connectors for synchronizing and controlling charging between multiple electric vehicle supply equipment and an electrified vehicle. An exemplary EVSE connector is connectable to a charge port assembly of an electrified vehicle and includes a first port configured to receive a first charger coupler of a first EVSE and a second port configured to receive a second charger coupler of a second EVSE. The EVSE connector further includes a control system for coordinating charging operations between the first and second EVSE and the electrified vehicle.

19 Claims, 6 Drawing Sheets

(51) Int. Cl.
  *H01R 13/66* (2006.01)
  *B60K 6/28* (2007.10)

(52) U.S. Cl.
  CPC ....... *B60Y 2300/91* (2013.01); *H01R 2201/26* (2013.01); *H02J 2310/48* (2020.01)

(56) References Cited

U.S. PATENT DOCUMENTS

| | | | |
|---|---|---|---|
| 10,471,838 B2 | 11/2019 | Rajaie et al. | |
| 11,208,002 B2* | 12/2021 | Noh | H02J 7/00034 |
| 2004/0130288 A1* | 7/2004 | Souther | B60L 58/10 |
| | | | 320/104 |
| 2013/0020993 A1* | 1/2013 | Taddeo | H02J 7/0042 |
| | | | 320/109 |
| 2013/0320922 A1* | 12/2013 | Acena | B60L 53/14 |
| | | | 320/109 |
| 2015/0137751 A1* | 5/2015 | King | B60L 50/51 |
| | | | 320/109 |
| 2015/0175006 A1* | 6/2015 | Back | B60L 1/006 |
| | | | 307/10.1 |
| 2015/0251551 A1* | 9/2015 | Mueller | B60L 3/0069 |
| | | | 320/109 |
| 2016/0137082 A1* | 5/2016 | Jefferies | B60L 53/16 |
| | | | 320/109 |
| 2017/0274791 A1* | 9/2017 | Lee | B60L 58/12 |
| 2018/0201147 A1 | 7/2018 | Shin et al. | |
| 2019/0202302 A1* | 7/2019 | Turik | B60L 53/18 |
| 2020/0304026 A1* | 9/2020 | Mu | H02M 3/1582 |
| 2021/0242691 A1* | 8/2021 | Hao | B60L 53/67 |
| 2021/0347270 A1* | 11/2021 | Cole | B60L 53/18 |

FOREIGN PATENT DOCUMENTS

| | | | | |
|---|---|---|---|---|
| CN | 214754335 U | * | 11/2021 | |
| DE | 202015102268 U1 | * | 6/2015 | ........... H01R 31/065 |
| DE | 102019115176 A1 | * | 12/2019 | ......... H01R 13/6683 |
| DE | 102020108730 A1 | * | 12/2020 | |
| DE | 102020114166 B3 | * | 8/2021 | |
| KR | 20210082763 A | * | 10/2021 | |
| WO | WO-2012134495 A1 | * | 10/2012 | ............ B60L 11/184 |
| WO | WO-2013039753 A1 | * | 3/2013 | ......... B60L 11/1816 |

\* cited by examiner

ELECTRIC VEHICLE SUPPLY EQUIPMENT SYNCHRONIZATION AND CHARGING CONNECTOR DEVICES

TECHNICAL FIELD

This disclosure relates generally to electrified vehicles, and more particularly to electric vehicle supply equipment connectors for synchronizing and controlling charging between multiple electric vehicle supply equipment and an electrified vehicle.

BACKGROUND

Electrified vehicles differ from conventional motor vehicles because they are selectively driven by one or more traction battery pack powered electric machines. The electric machines can propel the electrified vehicles instead of, or in combination with, an internal combustion engine. Some electrified vehicles, such as plug-in hybrid electric vehicles (PHEVs) and battery electric vehicles (BEVs), include a charge port that is connectable to a charger coupler of an electric vehicle supply equipment (EVSE) for charging the traction battery pack. A user is typically limited to plugging a single charger coupler into the vehicle charge port at a time.

SUMMARY

An electric vehicle supply equipment connector according to an exemplary aspect of the present disclosure includes, among other things, a housing, a first port disposed within the housing and configured to receive a first charger coupler of a first electric vehicle supply equipment (EVSE), and a second port disposed within the housing and configured to receive a second charger coupler of a second EVSE.

In a further non-limiting embodiment of the foregoing electric vehicle supply equipment connector, the first port and the second port are disposed within a front surface of the housing, and a coupler protrudes from a rear surface of the housing.

In a further non-limiting embodiment of either of the foregoing electric vehicle supply equipment connectors, a control system is housed inside the housing and includes a first charging circuit, a second charging circuit, a third charging circuit, and a microcontroller.

In a further non-limiting embodiment of any of the foregoing electric vehicle supply equipment connectors, the first charging circuit includes a printed circuit board that includes circuitry configured for communicating with a charging circuit of the first EVSE.

In a further non-limiting embodiment of any of the foregoing electric vehicle supply equipment connectors, the second charging circuit includes a printed circuit board that includes circuitry configured for communicating with a charging circuit of the second EVSE.

In a further non-limiting embodiment of any of the foregoing electric vehicle supply equipment connectors, the third charging circuit includes a printed circuit board that includes circuitry configured for communicating with a charging circuit of an onboard charger control module of an electrified vehicle.

In a further non-limiting embodiment of any of the foregoing electric vehicle supply equipment connectors, the microcontroller is programmed to communicate a first control signal to the first charging circuit for instructing the first charging circuit to communicate with a first charging circuit of the first EVSE for preparing the first EVSE for charging and is further programmed to communicate a second control signal to the second charging circuit for instructing the second charging circuit to communicate with a second charging circuit of the second EVSE for preparing the second EVSE for charging.

In a further non-limiting embodiment of any of the foregoing electric vehicle supply equipment connectors, the microcontroller is programmed to communicate a third control signal to the third charging circuit for instructing the third charging circuit to communicate with a charging circuit of an onboard charger control module for instructing the onboard charger control module to prepare an electrified vehicle for charging.

In a further non-limiting embodiment of any of the foregoing electric vehicle supply equipment connectors, the microcontroller is programmed to request a specific current output from each of the first EVSE and the second EVSE.

In a further non-limiting embodiment of any of the foregoing electric vehicle supply equipment connectors, the housing includes a hook configured for removably securing the housing to an electrified vehicle.

In a further non-limiting embodiment of any of the foregoing electric vehicle supply equipment connectors, the hook is positionable over a side mirror of the electrified vehicle.

In a further non-limiting embodiment of any of the foregoing electric vehicle supply equipment connectors, a coupler is connected to the housing by a cable.

An electrified vehicle charging system according to another exemplary aspect of the present disclosure includes, among other things, a charge port assembly mounted to an electrified vehicle and including an inlet port, an electric vehicle supply equipment (EVSE) connector connectable to the inlet port and including a first port and a second port, a first electric vehicle supply equipment (EVSE) connectable to the first port, and a second electric vehicle supply equipment (EVSE) connectable to the second port.

In a further non-limiting embodiment of the foregoing electrified vehicle charging system, the EVSE connector includes a control system including a first charging circuit configured to communicate with the first EVSE, a second charging circuit configured to communicate with the second EVSE, a third charging circuit configured to communicate with an onboard charger control module of the electrified vehicle, and a microcontroller.

In a further non-limiting embodiment of either of the foregoing electrified vehicle charging systems, the microcontroller is configured to instruct the first charging circuit to prepare the first EVSE for charging and to instruct the second charging circuit to prepare the second EVSE for charging.

In a further non-limiting embodiment of any of the foregoing electrified vehicle charging systems, the microcontroller is configured to instruct the third charging circuit to communicate with the onboard charger control module for preparing the electrified vehicle for charging.

In a further non-limiting embodiment of any of the foregoing electrified vehicle charging systems, the microcontroller is configured to request a specific current output from each of the first EVSE and the second EVSE and to deliver the specific current output to the onboard charger control module.

In a further non-limiting embodiment of any of the foregoing electrified vehicle charging systems, the first port and the second port are disposed within a front surface of a housing of the EVSE connector, and a coupler protrudes from a rear surface of the housing.

In a further non-limiting embodiment of any of the foregoing electrified vehicle charging systems, the coupler is connectable to the inlet port.

In a further non-limiting embodiment of any of the foregoing electrified vehicle charging systems, the EVSE connector includes a hook positioned over a side mirror of the electrified vehicle.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure describes electric vehicle supply equipment (EVSE) connectors for synchronizing and controlling charging between multiple electric vehicle supply equipment and an electrified vehicle. An exemplary EVSE connector is connectable to a charge port assembly of the electrified vehicle and includes a first port configured to receive a first charger coupler of a first EVSE and a second port configured to receive a second charger coupler of a second EVSE. The EVSE connector further includes a control system for coordinating charging operations between the first and second EVSE and the electrified vehicle. These and other features of this disclosure are discussed in greater detail in the following paragraphs of this detailed description.

Figure 1:
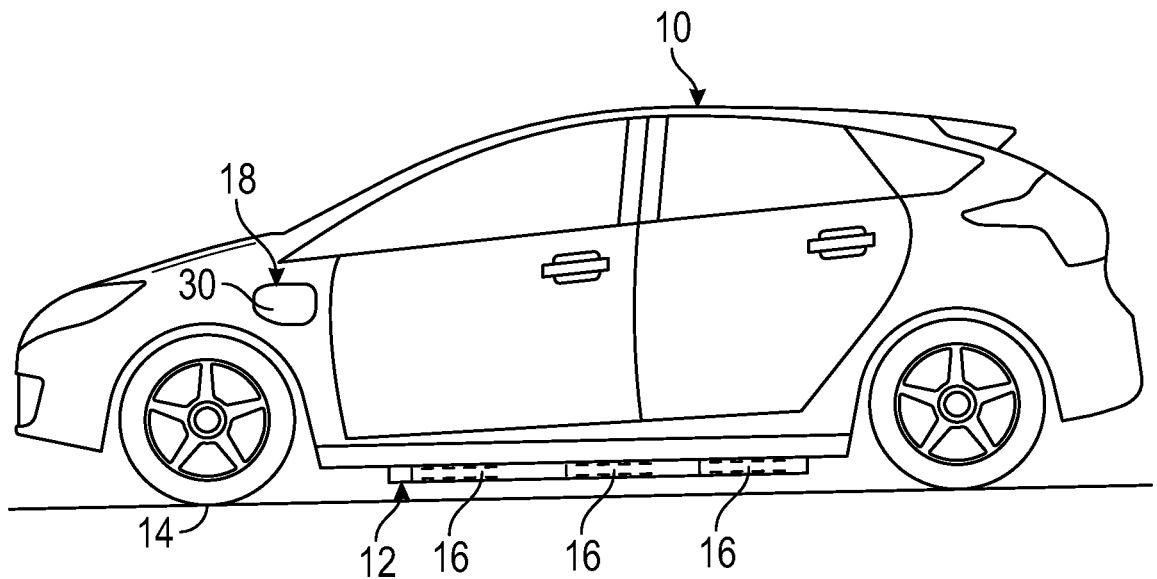
FIG. 1 is a side view of an electrified vehicle equipped with a charge port assembly.
Figure 2:
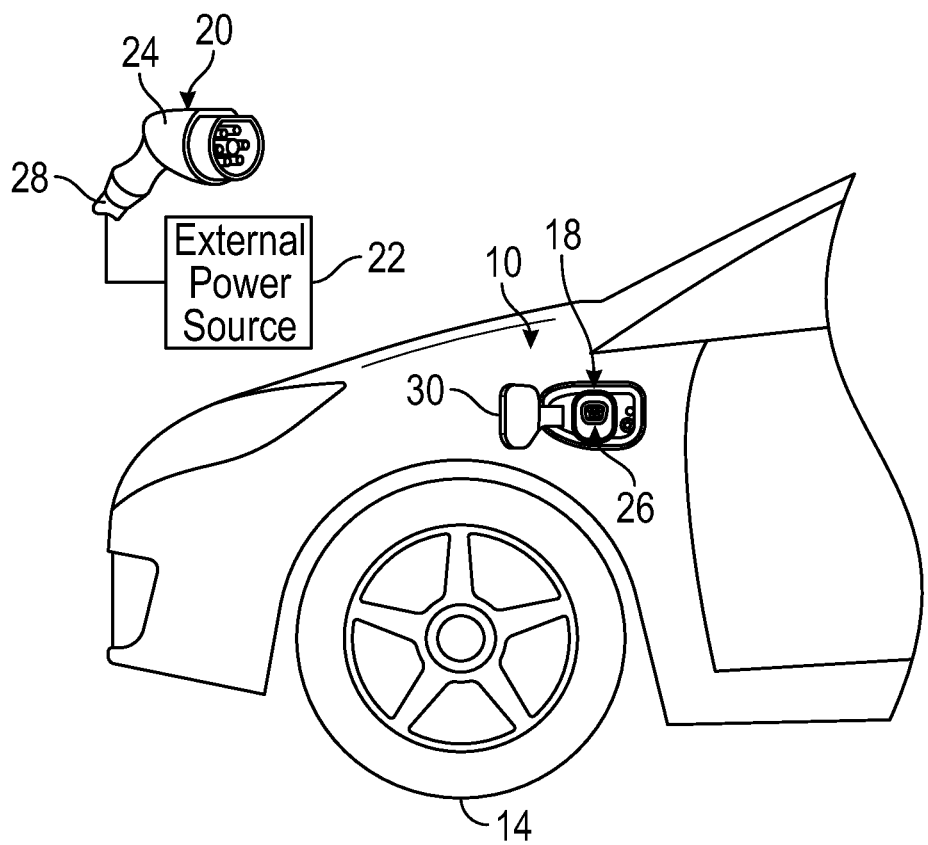
FIG. 2 is a blown-up view of the charge port assembly of the electrified vehicle of FIG. 1.

FIGS. 1 and 2 illustrate an exemplary electrified vehicle 10 that includes a traction battery pack 12. The electrified vehicle 10 may include any electrified powertrain capable of applying a torque from an electric machine (e.g., an electric motor) for driving drive wheels 14 of the electrified vehicle 10. In an embodiment, the electrified vehicle 10 is a plug-in hybrid electric vehicle (PHEV). In another embodiment, the electrified vehicle is a battery electric vehicle (BEV). Therefore, the powertrain may electrically propel the drive wheels 14 either with or without the assistance of an internal combustion engine.

The electrified vehicle 10 of FIGS. 1-2 is schematically illustrated as a car. However, the teachings of this disclosure may be applicable to any type of vehicle, including but not limited to, cars, trucks, vans, sport utility vehicles (SUVs), etc.

Although shown schematically, the traction battery pack 12 may be a high voltage traction battery pack that includes a plurality of battery arrays 16 (i.e., battery assemblies or groupings of battery cells) capable of outputting electrical power to one or more electric machines of the electrified vehicle 10. Other types of energy storage devices and/or output devices may also be used to electrically power the electrified vehicle 10.

From time to time, charging the energy storage devices of the traction battery pack 12 may be required or desirable. The electrified vehicle 10 may therefore be equipped with a charge port assembly 18 (sometimes referred to as a vehicle inlet assembly) for charging the energy storage devices (e.g., battery cells) of the traction battery pack 12. Electric vehicle supply equipment (EVSE) 20 may be operably connected between the charge port assembly 18 and an external power source 22 for transferring power therebetween. In an embodiment, the external power source 22 includes utility grid power. In another embodiment, the external power source 22 includes an alternative energy source, such as solar power, wind power, etc. In yet another embodiment, the external power source 22 includes a combination of utility grid power and alternative energy sources. The external power source 22 may be located at a home of the user, a public charging station, etc.

The EVSE 20 may include a charger coupler 24 that can be coupled to an inlet port 26 of the charge port assembly 18 to charge the traction battery pack 12 of the electrified vehicle 10 from the external power source 22. A cable 28 of the EVSE 20 may connect between the charger coupler 24 and a power outlet or charging station that is operably connected to the external power source 22.

The charge port assembly 18 may include a charge port door 30 that is closed during typical operation of the electrified vehicle 10. When charging the electrified vehicle 10 from the external power source 22 is desired, the charge port door 30 can move from the closed position shown in FIG. 1 to the open position shown in FIG. 2. A user can then connect the charger coupler 24 of the EVSE 20 to the inlet port 26 of the charge port assembly 18 so that power from the external power source 22 can be provided to the traction battery pack 12 of the electrified vehicle 10 for charging the battery cells contained therein.

The inlet port 26 of the exemplary charge port assembly 18 may be configured to receive AC power from the external power source 22. In another embodiment, the inlet port 26 of the charge port assembly 18 is configured to receive DC power from the external power source 22. In yet another example, the inlet port 26 is a combined AC/DC charge port that is configured to receive AC power, DC power, or both from the external power source 22. The EVSE 20 may thus be configured to provide any level of charging (e.g., level 1, level 2, DC, etc.).

Speed of charging is a common issue associated with charging electrified vehicles. One way to reduce charging times is by plugging multiple EVSE into the vehicle. This disclosure therefore describes EVSE connectors that provide users with the ability to plug-in multiple EVSE to the charge port assembly 18 for charging the energy storage devices of the traction battery pack 12 of the electrified vehicle 10.

Figure 3:
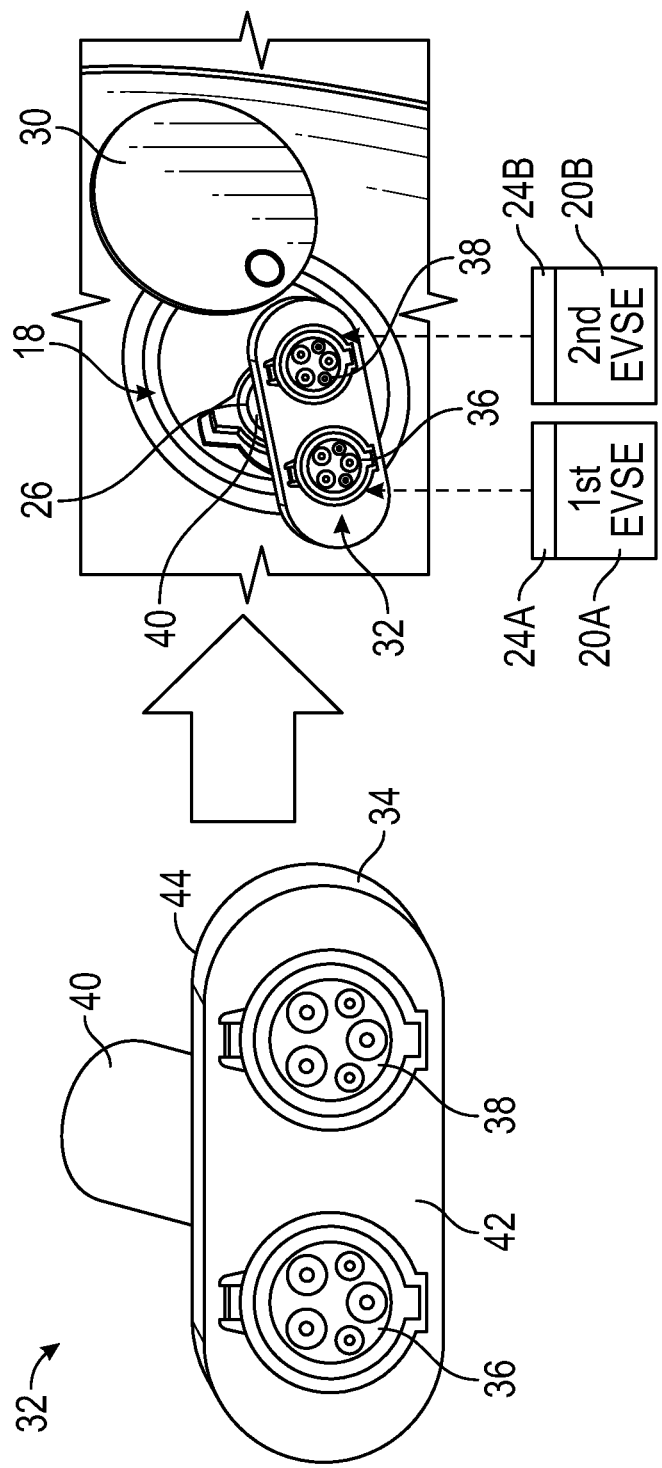
FIG. 3 illustrates an exemplary electric vehicle supply equipment (EVSE) connector that is connectable to a charge port assembly of an electrified vehicle.

FIG. 3 illustrates an exemplary EVSE connector 32 that may be plugged into the inlet port 26 of the charge port assembly 18 for allowing multiple (i.e., two or more) EVSE to charge the electrified vehicle 10 at the same time. The EVSE connector 32 is configured to synchronize and control charging between the multiple EVSE and the electrified vehicle 10.

The EVSE connector 32 may include a housing 34, a first port 36, a second port 38, and a coupler 40. The first port 36 and the second port 38 may be disposed within a front surface 42 of the housing 34, and the coupler 40 may extend from a rear surface 44 of the housing 34.

A first EVSE 20A may be plugged into the first port 36 of the EVSE connector 32. For example, a first charger coupler 24A of the first EVSE 20A may be plugged into the first port 36.

A second EVSE 20B may be plugged into the second port 38 of the EVSE connector 32. For example, a second charger coupler 24B of the second EVSE 20B may be plugged into the second port 38.

The coupler 40 of the EVSE connector 32 may be plugged into the inlet port 26 of the charge port assembly 18. The coupler 40 may be plugged into the inlet port 26 either before or after plugging the first EVSE 20A into the first port 36 and/or the second EVSE 20B into the second port 38.

Together, the charge port assembly 18, the EVSE connector 32, and the EVSE 20A, 20B establish a charging system of the electrified vehicle 10. Therefore, the charging system may include charging components located both onboard and offboard the electrified vehicle 10.

Figure 4:
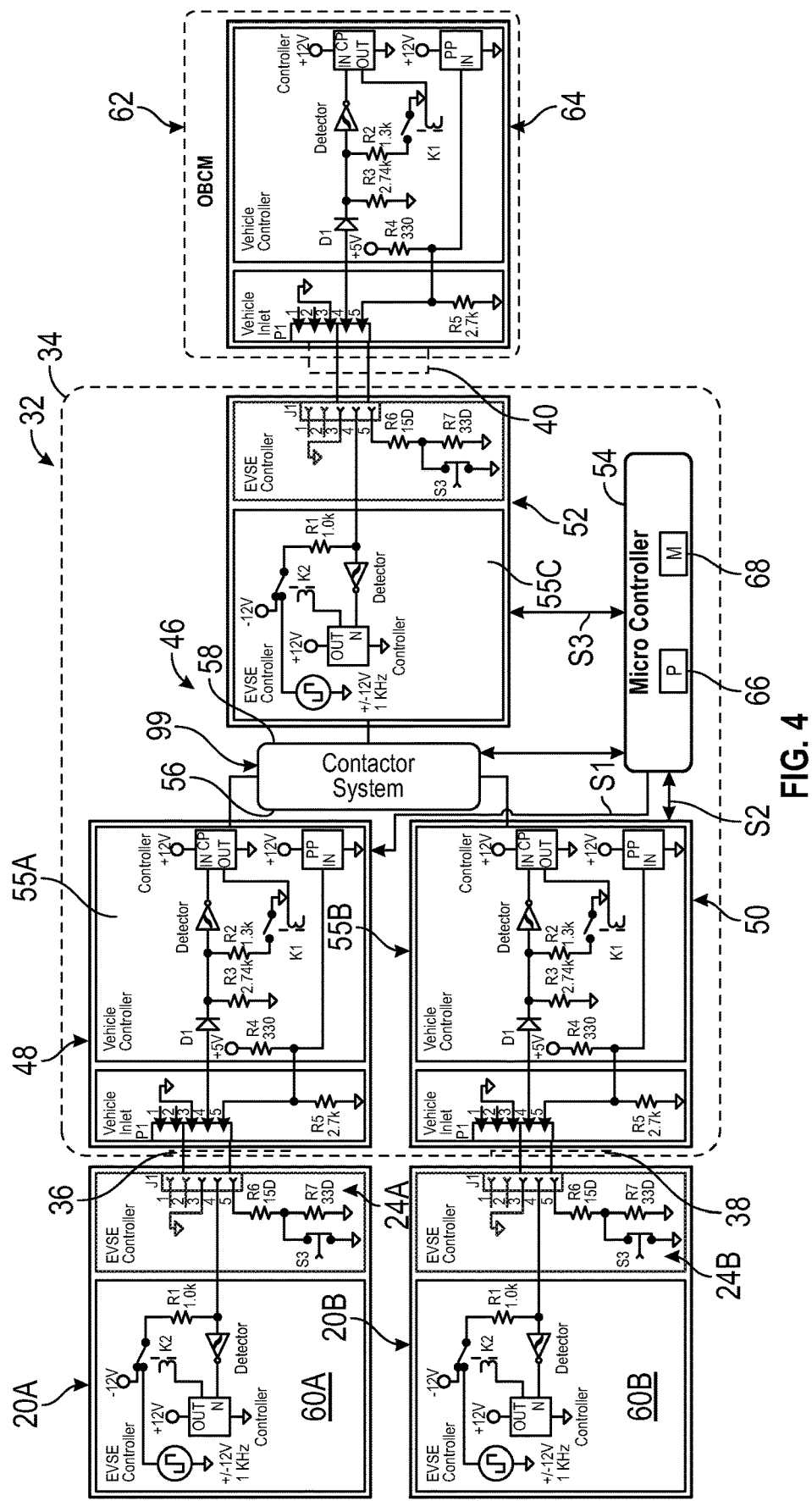
FIG. 4 schematically illustrates a control system of an EVSE connector for synchronizing and controlling charging between multiple EVSE and an electrified vehicle.

A control system 46 of the EVSE connector 32 is schematically illustrated in FIG. 4. The control system 46 is adapted to synchronize and control the supply of power between the multiple EVSE 20A, 20B and the electrified vehicle 10 when charging the traction battery pack 12. Although two EVSE 20A, 20B are shown in FIGS. 3 and 4, the EVSE connector 32 could be configured to enable the connection of additional EVSE when charging the electrified vehicle 10.

The control system 46 may be housed inside the housing 34 and may include a first charging circuit 48, a second charging circuit 50, a third charging circuit 52, and a microcontroller 54. The first charging circuit 48 and the second charging circuit 50 may be located on an input side 56 of a contactor system 99 of the charging system, and the third charging circuit 52 may be located on an output side 58 of the contactor system 99.

Figure 5:
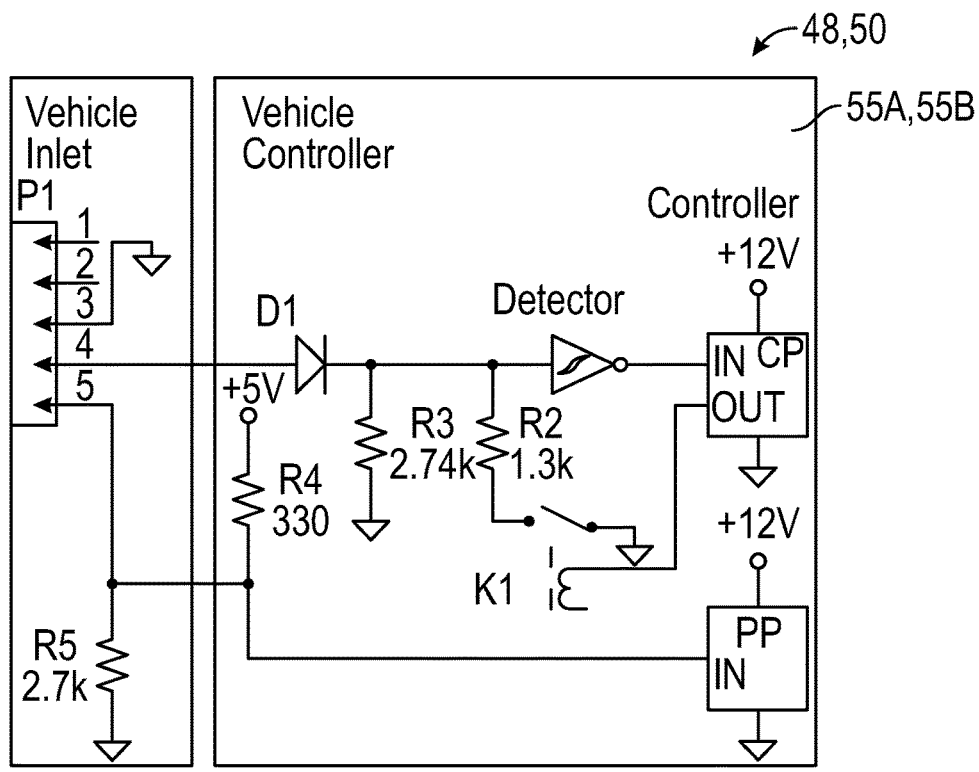
FIG. 5 illustrates an exemplary EVSE-side charging circuit of the control system of the EVSE connector of FIG. 4.

The first charging circuit 48 may communicate with and coordinate operations of the first EVSE 20A when the first EVSE 20A is plugged into the first port 36 of the EVSE connector 32. For example, the first charging circuit 48 may communicate with a first charging circuit 60A of the first EVSE 20A to instruct the first EVSE 20A to prepare for charging. The first charging circuit 48 includes a printed circuit board (PCB) 55A that includes the necessary circuitry (see, e.g., FIG. 5) for communicating with and coordinating the operations of the first EVSE 20A. The circuitry included on the PCB 55A may include, but is not limited to, ground pilot ports, resistors, switches, sensors, and diodes for controlling communications and power transfer.

The second charging circuit 50 may communicate with and coordinate operations of the second EVSE 20B when the second EVSE 20B is plugged into the second port 38 of the EVSE connector 32. For example, the second charging circuit 50 may communicate with a second charging circuit 60B of the second EVSE 20A to instruct the second EVSE 20B to prepare for charging. The second charging circuit 50 includes a printed circuit board (PCB) 55B that includes the necessary circuitry (see, e.g., FIG. 5) for communicating with and coordinating the operations of the second EVSE 20B. The circuitry included on the PCB 55B may include, but is not limited to, ground pilot ports, resistors, switches, sensors, and diodes for controlling communications and power transfer.

Figure 6:
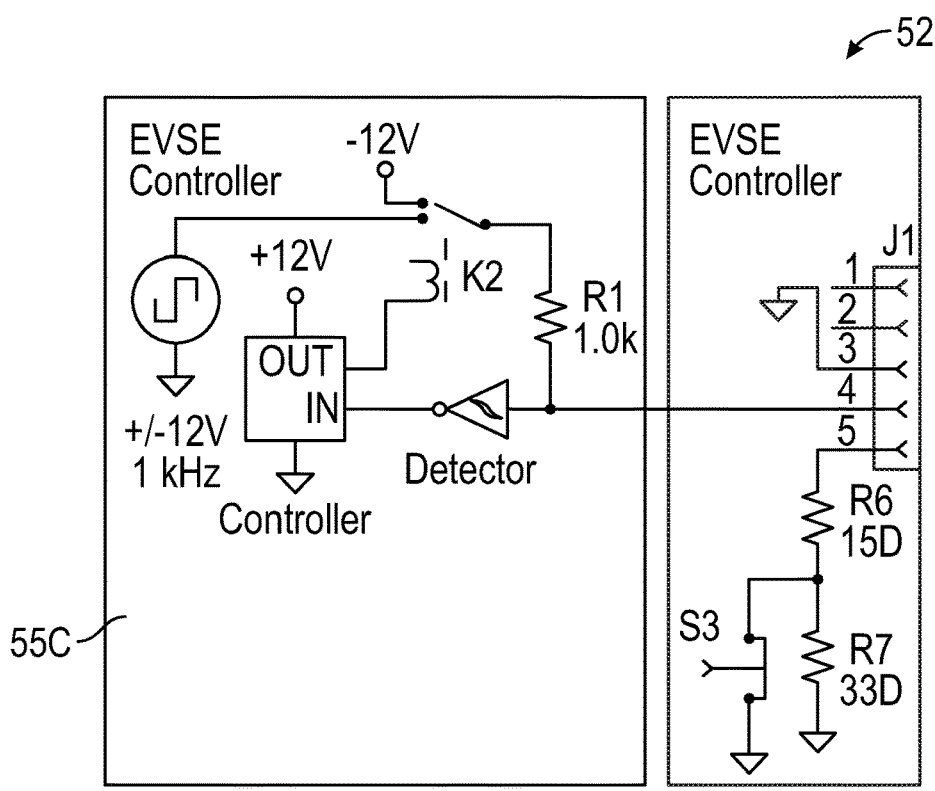
FIG. 6 illustrates an exemplary vehicle-side charging circuit of the control system of the EVSE connector of FIG. 4.

The third charging circuit 52 may communicate with an onboard charger control module 62 that is located on the electrified vehicle 10 when the coupler 40 of the EVSE connector 32 is plugged into the inlet port 26 of the charge port assembly 18. The onboard charger control module 62 is programmed with the necessary power electronics for converting AC power received from either or both of the first EVSE 20A and the second EVSE 20B to DC power for charging the energy storage devices of the traction battery pack 12. The onboard charger control module 62 may be further equipped to perform various inverting and rectifying operations. The third charging circuit 52 may communicate with a charging circuit 64 of the onboard charger control module 62 for instructing the onboard charger control module 62 to prepare the electrified vehicle 10 for charging. The third charging circuit 52 includes a printed circuit board (PCB) 55C that includes the necessary circuitry (see, e.g., FIG. 6) for communicating with and coordinating operations of the onboard charger control module 62. The circuitry included on the PCB 55C may include, but is not limited to, ground pilot ports, resistors, switches, sensors, and diodes for controlling communications and power transfer.

The control system 46 may include a dedicated charging circuit for each EVSE that might be connected to the EVSE connector 32. In an embodiment, the first charging circuit 48 and the second charging circuit 50 are duplicate circuits that are substantially identical to the charging circuit 64 of the onboard charger control module 62, and the third charging circuit 52 is a duplicate circuit that is substantially identical to the first and second charging circuits 60A, 60B of the first and second EVSE 20A, 20B. By using duplicate circuits, the control system 46 of the EVSE connector 32 is capable of synchronizing and controlling each connected EVSE 20A, 20B, through the microcontroller 54, when charging the electrified vehicle 10.

The microcontroller 54 is programmable for coordinating and controlling the transfer of power between the multiple EVSE 20A, 20B and the electrified vehicle 10. The microcontroller 54 may include a processing unit 66 and non-transitory memory 68 for executing the various control strategies and modes of the EVSE connector 32. The microcontroller 54 may be configured to receive various inputs from the first and second charging circuits 48, 50 of the control system 46, analyze these inputs, and then command various operations of the third charging circuit 52 for controlling the transfer of power from the multiple EVSE 20A, 20B to the electrified vehicle 10.

The processing unit 66 can be a custom made or commercially available processor, a central processing unit (CPU), or generally any device for executing software instructions. The memory 68 can include any one or combination of volatile memory elements and/or nonvolatile memory elements.

The processing unit 66 of the microcontroller 54 is configured to execute one or more programs stored in the memory. In an embodiment, the processing unit 66 of the microcontroller 54 is programmed to communicate a first control signal S1 to the first charging circuit 48 for instructing the first charging circuit 48 to communicate with the first charging circuit 60A to prepare the first EVSE 20A for charging. In another embodiment, the processing unit 66 of the microcontroller 54 is programmed to communicate a second control signal S2 to the second charging circuit 50 for instructing the second charging circuit 50 to communicate with the second charging circuit 60B to prepare the second EVSE 20B for charging. In another embodiment, the processing unit 66 of the microcontroller 54 is programmed to communicate a third control signal S3 to the third charging circuit 52 for instructing the third charging circuit 52 to communicate with the charging circuit 64 of the onboard charger control module 62 for instructing the onboard charger control module 62 to prepare the electrified vehicle 10 for charging. In yet another embodiment, the processing unit 66 of the microcontroller 54 is programmed to request a specific current output from each of the EVSE 20A, 20B and control a high voltage contactor system 99 for delivering the requested current output to the electrified vehicle 10 when charging. The high voltage contactor system 99 may include a plurality of contactors that can be controlled to open and close the high voltage power lines that connect between the various components of the charging system.

Figure 7:
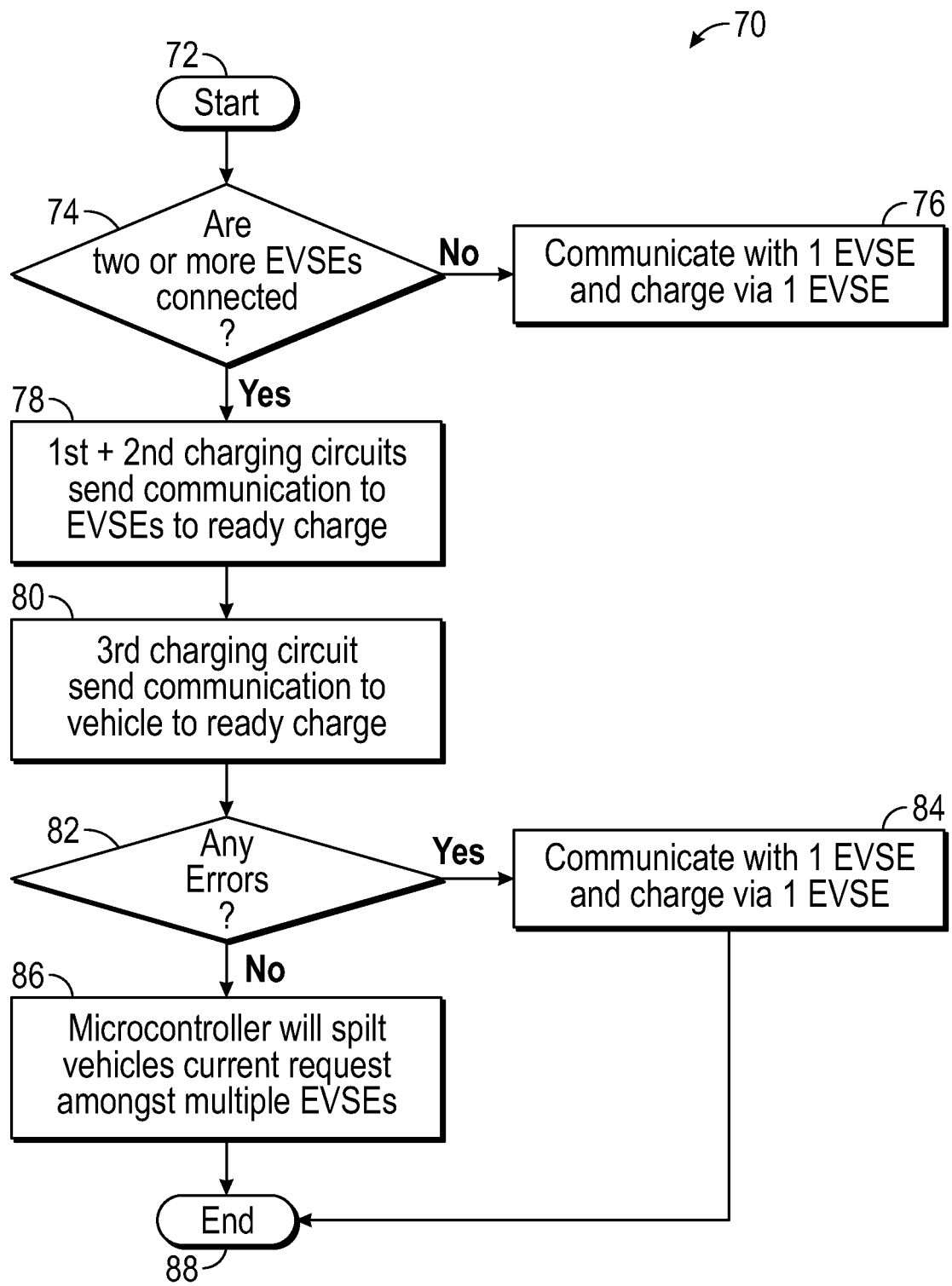
FIG. 7 schematically illustrates an exemplary method for synchronizing and controlling charging between multiple EVSE and an electrified vehicle.

FIG. 7, with continued reference to FIGS. 1-6, schematically illustrates an exemplary method 70 for controlling the EVSE connector 32 for synchronizing and controlling charging between multiple EVSE 20A, 20B and the electrified vehicle 10. In an embodiment, the processing unit 66 of the microcontroller 54 of the EVSE connector 32 is programmed with one or more algorithms adapted to execute the exemplary method 70.

The exemplary method 70 may begin at block 72. At block 74, the microcontroller 54 may determine whether two or more EVSE 20 have been connected to the EVSE connector 32. The microcontroller 54 may make this determination based on signals received from the first charging circuit 48 and/or the second charging circuit 50 when the first charger coupler 24A of the first EVSE 20A is plugged into the first port 36 of the EVSE connector 32 and/or the second charger coupler 24B of the second EVSE 20B is plugged into the second port 38 of the EVSE connector 32.

If a "NO" flag is returned at block 74, the EVSE connector 32 communicates (e.g., via either the first charging circuit 48 or the second charging circuit 50) with the EVSE that is plugged into the EVSE connector 32 and the electrified vehicle 10 is charged via only the single EVSE at block 76.

Alternatively, if a "YES" flag is returned at block 74, the method 70 may proceed to block 78. At this step, the microcontroller 54 may communicate the control signal S1 to the first charging circuit 48 and the control signal S2 to the second charging circuit 50 for instructing the first and second charging circuits 48, 50 to communicate with the first and second charging circuits 60A, 60B to prepare the first and second EVSE 20A, 20B for charging. Next, at block 80, the microcontroller 54 may communicate the control signal S3 to the third charging circuit 52 for instructing the third charging circuit 52 to communicate with the charging circuit 64 of the onboard charger control module 62 for preparing the electrified vehicle 10 for charging.

The microcontroller 54 may next analyze the charging system for any errors at block 82. If errors are detected, the method 70 proceeds to block 84 and the EVSE connector 32 communicates (e.g., via either the first charging circuit 48 or the second charging circuit 50) with the EVSE that is plugged into the EVSE connector 32 and the electrified vehicle 10 is charged via only the single EVSE. Alternatively, if no errors are detected, the method 70 proceeds to block 86 and the microcontroller 54 splits the current requested from the electrified vehicle 10 between each of the connected EVSE. The method 70 may end at block 88.

Figure 8:
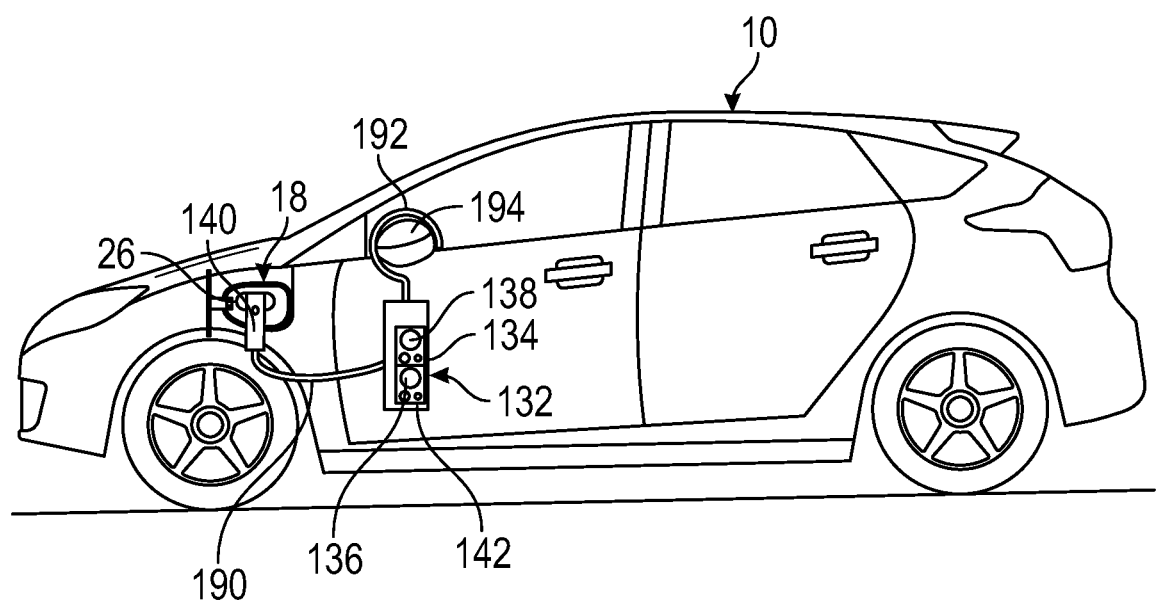
FIG. 8 illustrates another exemplary EVSE connector that is connectable to a charge port assembly of an electrified vehicle.

FIG. 8 illustrates another exemplary EVSE connector 132 that may be plugged into the inlet port 26 of the charge port assembly 18 for allowing multiple EVSE to charge the electrified vehicle 10 at the same time. Like the EVSE connector 32 discussed above, the EVSE connector 132 is configured to synchronize and control charging between multiple EVSE (i.e., two or more) and the electrified vehicle 10.

The EVSE connector 132 may include a housing 134, a first port 136, a second port 138, and a coupler 140. The first port 136 and the second port 138 may be disposed within a front surface 142 of the housing 134. The coupler 140 may be connected to the housing 134 by a cable 190.

A first EVSE may be plugged into the first port 136 of the EVSE connector 132, and a second EVSE may be plugged into the second port 138 of the EVSE connector 132. The coupler 140 of the EVSE connector 132 may be plugged into the inlet port 26 of the charge port assembly 18.

The housing 134 of the EVSE connector 132 may include a hook 192, or some other holding device, for removably securing the housing 134 to the electrified vehicle 10. In an embodiment, the hook 192 may be positioned over a side mirror 194 of the electrified vehicle 10 in order to position the housing 134 at a convenient location for connecting the multiple EVSE to the EVSE connector 132 when charging the electrified vehicle 10.

The EVSE connector 132 may include a control system that is substantially similar to the control system 46 of the EVSE connector 32 illustrated in FIG. 4. The control system is adapted to synchronize and control the supply of power between the multiple EVSE and the electrified vehicle 10 when charging the electrified vehicle 10.

The EVSE connectors of this disclosure may be incorporated into electrified vehicle charging systems for allowing multiple EVSE inputs when charging the electrified vehicle. The EVSE connectors described herein are standalone devices that do not require any additional hardware to either the EVSE or the electrified vehicle. By providing the ability to connect multiple EVSE at the same time, charging times can be significantly reduced, thereby providing a more satisfying user experience.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An electric vehicle supply equipment connector, comprising:
   a housing;
   a first port disposed within the housing and configured to receive a first charger coupler of a first electric vehicle supply equipment (EVSE); and
   a second port disposed within the housing and configured to receive a second charger coupler of a second EVSE that is a completely separate structure from the first EVSE,
   wherein the housing includes a hook configured for removably securing the housing to an electrified vehicle.

2. The electric vehicle supply equipment connector as recited in claim 1, wherein the first port and the second port are disposed within a front surface of the housing, and comprising a coupler protruding from a rear surface of the housing.

3. The electric vehicle supply equipment connector as recited in claim 1, wherein the hook is positioned over a side mirror of the electrified vehicle.

4. The electric vehicle supply equipment connector as recited in claim 1, comprising a coupler connected to the housing by a cable.

5. An electric vehicle supply equipment connector, comprising:
   a housing;
   a first port disposed within the housing and configured to receive a first charger coupler of a first electric vehicle supply equipment (EVSE);
   a second port disposed within the housing and configured to receive a second charger coupler of a second EVSE; and
   control system housed inside the housing and including a first charging circuit, a second charging circuit, a third charging circuit, and a microcontroller.

6. The electric vehicle supply equipment connector as recited in claim 5, wherein the first charging circuit includes a printed circuit board that includes circuitry configured for communicating with a charging circuit of the first EVSE.

7. The electric vehicle supply equipment connector as recited in claim 5, wherein the second charging circuit includes a printed circuit board that includes circuitry configured for communicating with a charging circuit of the second EVSE.

8. The electric vehicle supply equipment connector as recited in claim 5, wherein the third charging circuit includes a printed circuit board that includes circuitry configured for communicating with a charging circuit of an onboard charger control module of an electrified vehicle.

9. The electric vehicle supply equipment connector as recited in claim 5, wherein the microcontroller is programmed to communicate a first control signal to the first charging circuit for instructing the first charging circuit to communicate with a first charging circuit of the first EVSE for preparing the first EVSE for charging and is further programmed to communicate a second control signal to the second charging circuit for instructing the second charging circuit to communicate with a second charging circuit of the second EVSE for preparing the second EVSE for charging.

10. The electric vehicle supply equipment connector as recited in claim 9, wherein the microcontroller is programmed to communicate a third control signal to the third charging circuit for instructing the third charging circuit to communicate with a charging circuit of an onboard charger control module for instructing the onboard charger control module to prepare an electrified vehicle for charging.

11. The electric vehicle supply equipment connector as recited in claim 5, wherein the microcontroller is programmed to request a specific current output from each of the first EVSE and the second EVSE.

12. An electrified vehicle charging system, comprising:
    a charge port assembly mounted to an electrified vehicle and including an inlet port;
    an electric vehicle supply equipment (EVSE) connector connectable to the inlet port and including a first port and a second port;
    a first electric vehicle supply equipment (EVSE) connectable to the first port; and
    a second electric vehicle supply equipment (EVSE) connectable to the second port,
    wherein the second EVSE is a completely separate structure from the first EVSE.

13. The electrified vehicle charging system as recited in claim 12, wherein the EVSE connector includes a control system including a first charging circuit configured to communicate with the first EVSE, a second charging circuit configured to communicate with the second EVSE, a third charging circuit configured to communicate with an onboard charger control module of the electrified vehicle, and a microcontroller.

14. The electrified vehicle charging system as recited in claim 13, wherein the microcontroller is configured to instruct the first charging circuit to prepare the first EVSE for charging and to instruct the second charging circuit to prepare the second EVSE for charging.

15. The electrified vehicle charging system as recited in claim 13, wherein the microcontroller is configured to instruct the third charging circuit to communicate with the onboard charger control module for preparing the electrified vehicle for charging.

16. The electrified vehicle charging system as recited in claim 13, wherein the microcontroller is configured to request a specific current output from each of the first EVSE and the second EVSE and to deliver the specific current output to the onboard charger control module.

17. The electrified vehicle charging system as recited in claim 12, wherein the first port and the second port are disposed within a front surface of a housing of the EVSE connector, and comprising a coupler protruding from a rear surface of the housing.

18. The electrified vehicle charging system as recited in claim 17, wherein the coupler is connectable to the inlet port.

19. The electrified vehicle charging system as recited in claim 12, wherein the EVSE connector includes a hook positioned over a side mirror of the electrified vehicle.

* * * * *